US007839371B2

(12) United States Patent
Yokoyama et al.

(10) Patent No.: US 7,839,371 B2
(45) Date of Patent: Nov. 23, 2010

(54) LIQUID CRYSTAL DISPLAY DEVICE, METHOD OF DRIVING THE SAME, AND METHOD OF MANUFACTURING THE SAME

(75) Inventors: Ryoichi Yokoyama, Tokyo (JP); Michiru Senda, Tokyo (JP); Tsutomu Uemoto, Cheonan (KR)

(73) Assignee: Samsung Electronics Co., Ltd. (KR)

( * ) Notice: Subject to any disclaimer, the term of this patent is extended or adjusted under 35 U.S.C. 154(b) by 819 days.

(21) Appl. No.: 11/768,584

(22) Filed: Jun. 26, 2007

(65) Prior Publication Data

US 2008/0013007 A1 Jan. 17, 2008

(30) Foreign Application Priority Data

Jun. 26, 2006 (KR) ...................... 10-2006-0057701

(51) Int. Cl.
*G09G 3/36* (2006.01)
*G02F 1/1343* (2006.01)

(52) U.S. Cl. ............................ 345/90; 345/87; 349/38; 349/39

(58) Field of Classification Search ....................... None
See application file for complete search history.

(56) References Cited

U.S. PATENT DOCUMENTS

| | | | | |
|---|---|---|---|---|
| 6,104,367 A * | 8/2000 | McKnight | .................... | 345/94 |
| 6,329,971 B2 * | 12/2001 | McKnight | .................... | 345/95 |
| 7,324,933 B2 * | 1/2008 | Shen et al. | .................... | 703/21 |
| 2004/0041768 A1 * | 3/2004 | Chen et al. | .................... | 345/90 |
| 2006/0007192 A1 * | 1/2006 | De Smet et al. | ............. | 345/204 |
| 2006/0038761 A1 * | 2/2006 | Shen et al. | .................... | 345/92 |

FOREIGN PATENT DOCUMENTS

| | | |
|---|---|---|
| JP | 2002296617 | 10/2002 |
| JP | 2003-222902 | 8/2003 |
| JP | 2005140937 | 6/2005 |
| JP | 2005-326624 | 11/2005 |
| KR | 1020020044673 | 6/2002 |

* cited by examiner

*Primary Examiner*—Bipin Shalwala
*Assistant Examiner*—Daniel Bedell
(74) *Attorney, Agent, or Firm*—Cantor Colburn LLP

(57) ABSTRACT

In a liquid crystal display device includes; a plurality of pixels arranged substantially in a matrix pattern; wherein each of the plurality of pixel includes; first and second thin film transistors including current paths connected to a source line in series, a storage capacitor line, a first capacitor connected between the first and second thin film transistors and connected to the storage capacitor line, a second capacitor connected between one of the source and the drain of the second thin film transistor and a pixel electrode and connected to the storage capacitor line, and a third capacitor including the pixel electrode, a common electrode, and a liquid crystal between the pixel electrode and the common electrode, wherein an overdrive voltage Vover satisfying equation $$Vover = \frac{C1}{C2 + Clc} \cdot Vsig$$

is added to a display signal voltage Vsig and a resultant voltage is applied to the source line.

11 Claims, 10 Drawing Sheets

LIQUID CRYSTAL DISPLAY DEVICE, METHOD OF DRIVING THE SAME, AND METHOD OF MANUFACTURING THE SAME

This application claims priority to Korean Patent Application No. 2006-57701, filed on Jun. 26, 2006, and all the benefits accruing therefrom under 35 U.S.C. §119, the contents of which in its entirety are herein incorporated by reference.

BACKGROUND OF THE INVENTION

1. Field of the Invention

The present invention relates to a liquid crystal module, a method of driving the liquid crystal module, and a liquid crystal display.

2. Description of the Related Art

Generally, liquid crystal displays ("LCDs") have superior characteristics, such as low-voltage driving, low power consumption, light weight, and slimness, and therefore they have been used as monitors of personal computers, or displays of TVs.

A transmissive-type liquid crystal display includes a backlight unit and a liquid crystal module arranged in a front side of the backlight unit. The backlight unit supplies light to a display panel of the liquid crystal module. The liquid crystal module uses a plurality of pixels to modulate the light supplied from the backlight unit and displays the modulated light as an image. The backlight unit has a reflection plate, a light source, and an optical sheet. In addition, the backlight unit applies a current to the light source, which thereby enables the light source to supply light to the display panel.

In a reflective-type liquid crystal display, a pixel electrode of a liquid crystal module includes a reflective metal component. Light incident onto the liquid crystal module from an exterior is modulated by a liquid crystal layer, reflected by the pixel electrode, and then output to the exterior. The reflective-type liquid crystal display may also include a side light unit, which supplies light from a side of the liquid crystal module.

Recently, in order to improve the display quality of liquid crystal displays, liquid crystal displays including a plurality of thin film transistors ("TFTs") per pixel have been developed. For examples, see Japanese patent publication number 2005-140937, Japanese patent publication number 2005-326624, Japanese patent publication number 2002-296617, and Japanese patent publication number 2003-222902.

The liquid crystal module displays images by using a pixel TFT provided in one area of a pixel to supply a voltage to the liquid crystal of the liquid crystal module. Electric charges are charged into a storage capacitor, which is connected to a source electrode and a control electrode of the pixel TFT. An insulator or semiconductor is interposed between the source and control electrodes. A liquid crystal capacitor, which includes a pixel electrode, a common electrode and a liquid crystal layer is interposed between the pixel electrode and the common electrode. When the voltage supplied between the pixel electrode and the common electrode is varied an alignment state of liquid crystal may be changed. This change in the alignment state of the liquid crystal affects the transmittance of the pixel.

Liquid crystal displays may display moving images by rapidly displaying a series of slightly changing images. Each image is displayed for a time period called a frame.

In order to display an image, the liquid crystal module maintains the potential difference between the pixel electrode and the common electrode to control an alignment state of liquid crystal during one frame. However, a current path within the pixel TFT makes the potential of the pixel electrode difficult to be constantly maintained during the one frame. If the potential of the pixel electrode is not constantly maintained during the one frame, the alignment state of the liquid crystal is changed, so a desired image is not displayed during the entire length of the frame.

BRIEF SUMMARY OF THE INVENTION

The present invention provides a liquid crystal display device capable of displaying a desired image by maintaining a potential of a pixel electrode during substantially an entire frame, that is, until a next frame starts.

The present invention also provides a method of driving the liquid crystal module.

The present invention also provides a liquid crystal display including the liquid crystal module.

In one exemplary embodiment of the present invention, a liquid crystal module includes; a plurality of pixels arranged substantially in a matrix pattern, wherein each of the plurality of pixel includes, a first thin film transistor including a source, a drain, and a gate, in which one of the source and the drain is connected to a source line, and the gate is connected to a first gate signal line, a second thin film transistor including a source, a drain, and a gate, in which one of the source and the drain of the second thin film transistor is connected to a pixel electrode, the other one of the source and the drain of the second thin film transistor is connected to one of the source and the drain of the first thin film transistor, and the gate of the second thin film transistor is connected to the second gate signal line, a storage capacitor line, a first capacitor connected between the first thin film transistor and the second thin film transistor and connected to the storage capacitor line, a second capacitor connected between one of the source and the drain of the second thin film transistor and the pixel electrode and connected to the storage capacitor line, and a third capacitor including the pixel electrode, a common electrode, and a liquid crystal layer disposed between the pixel electrode and the common electrode, wherein an overdrive voltage Vover satisfying an equation $$Vover = \frac{C1}{C2 + Clc} \cdot Vsig$$

is added to a display signal voltage Vsig and a resultant voltage thereof is applied to the source line, and wherein C1, C2 and Clc represent the first capacitor, the second capacitor, and the third capacitor, respectively.

In another exemplary embodiment of the present invention, a method of driving a liquid crystal display device includes; a plurality of pixels arranged substantially in a matrix pattern, wherein each pixel includes a first thin film transistor including a source, a drain, and a gate, in which one of the source and the drain is connected to a source line, and the gate is connected to a first gate signal line, a second thin film transistor including a source, a drain, and a gate, wherein one of the source and the drain of the second thin film transistor is connected to a pixel electrode, the other one of the source and the drain of the second thin film transistor is connected to the source or the drain of the first thin film transistor, and the gate of the second thin film transistor is connected to the second gate signal line, a storage capacitor line, a first capacitor including a junction part between the first thin film transistor and the second thin film transistor, the storage capacitor line, and a first insulator between the junction part and the storage capacitor line, a second capacitor including the source or the drain of the second thin film transistor connected to the pixel electrode, the storage capacitor line, and a second insulator between the source or the drain of the second thin film transistor and the storage capacitor line, and a third capacitor including the pixel electrode, a common electrode, and a liquid crystal layer disposed between the pixel electrode and the common electrode, the method comprising; adding an overdrive voltage Vover satisfying an equation $$Vover = \frac{C1}{C2 + Clc} \cdot Vsig$$

to a display signal voltage Vsig and applying a resultant voltage to the source line.

In another exemplary embodiment of the present invention, a method of manufacturing a display device includes; disposing a plurality of pixels in a substantially matrix shaped pattern, forming each of the plurality of pixels to include a first thin film transistor and a second thin film transistor, each of the thin film transistors including a source, a drain, and a gate, connecting the gate line of the first transistor to a gate signal line, connecting one of the source and the drain of the second thin film transistor to a pixel electrode, connecting the other one of the source and the drain of the second thin film transistor to one of the source and the drain of the first thin film transistor, connecting the gate of the second thin film transistor to a second gate signal line, forming a storage capacitor line, connecting a first capacitor to a region between the first thin film transistor and the second thin film transistor and the storage capacitor line, connecting a second capacitor to a region between one of the source and the drain of the second thin film transistor and the pixel electrode and the storage capacitor line, and forming a third capacitor including the pixel electrode, a common electrode, and a liquid crystal layer disposed between the pixel electrode and the common electrode, wherein an overdrive voltage Vover satisfying an equation $$Vover = \frac{C1}{C2 + Clc} \cdot Vsig$$

is added to a display signal voltage Vsig and a resultant voltage thereof is applied to the source line.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
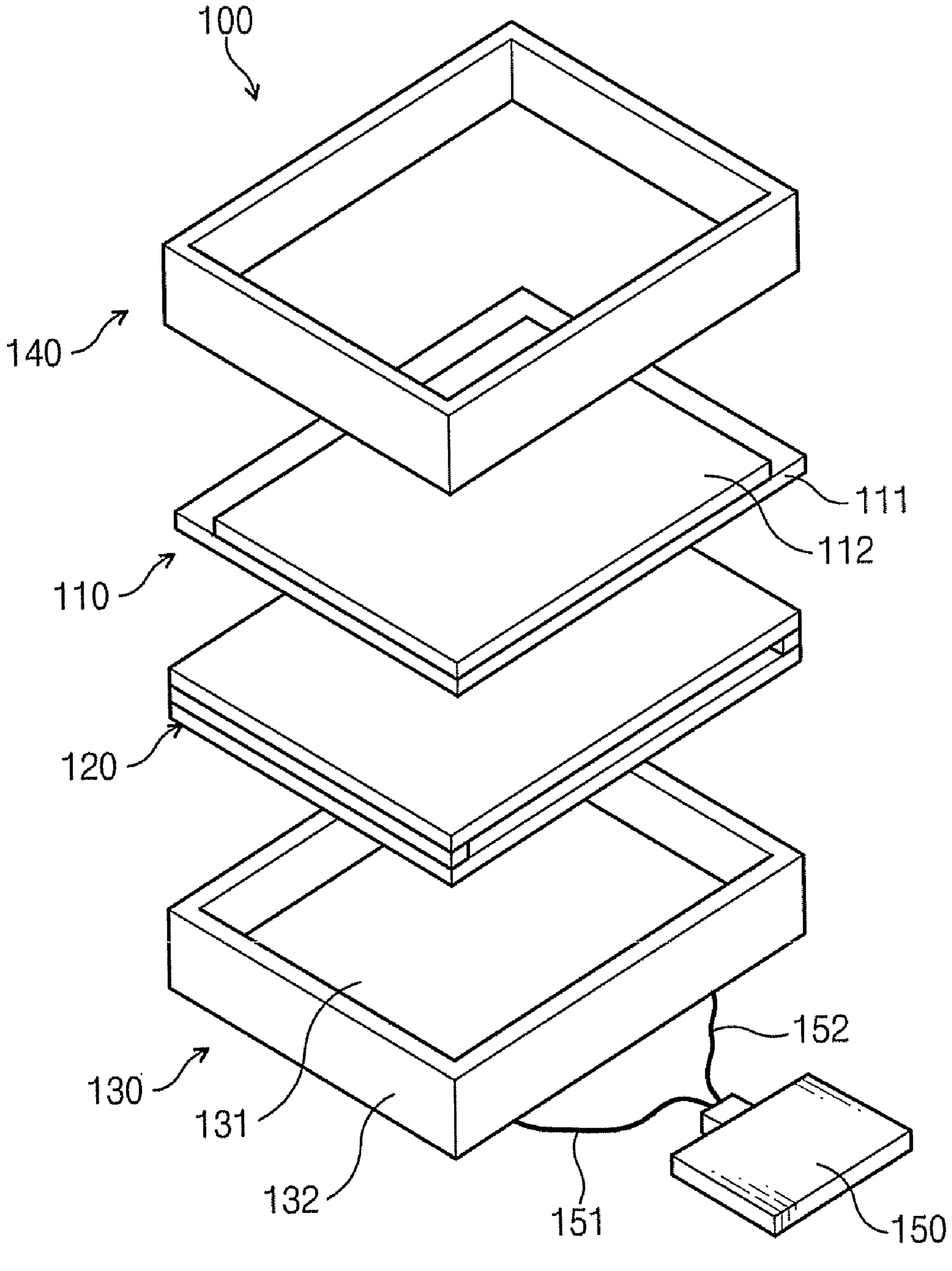
FIG. 1 is an exploded perspective view showing an exemplary embodiment of a liquid crystal display according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as “lower” or “bottom” and “upper” or “top,” may be used herein to describe one element’s relationship to another elements as illustrated in the Figures. It will be understood that relative terms are intended to encompass different orientations of the device in addition to the orientation depicted in the Figures. For example, if the device in one of the figures is turned over, elements described as being on the “lower” side of other elements would then be oriented on “upper” sides of the other elements. The exemplary term “lower”, can therefore, encompasses both an orientation of “lower” and “upper,” depending of the particular orientation of the figure. Similarly, if the device in one of the figures is turned over, elements described as “below” or “beneath” other elements would then be oriented “above” the other elements. The exemplary terms “below” or “beneath” can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Embodiment 1

FIG. 1 is an exploded perspective view showing an exemplary embodiment of a liquid crystal display according to the present invention.

Referring to FIG. 1, a liquid crystal display (“LCD”) 100 includes a liquid crystal module 110, a backlight unit 120, a container 130 which contains the liquid crystal module 110 and the backlight unit 120, and a top chassis 140.

The liquid crystal module 110 includes a thin film transistor (“TFT”) substrate 111, an opposite substrate 112, which faces the TFT substrate 111, and a liquid crystal layer (not shown) arranged between the TFT substrate 111 and the opposite substrate 112. In one exemplary embodiment the opposite substrate 112 comprises a color filter substrate.

Exemplary embodiments of the present invention are not limited to the use of the TFT substrate 111, but can employ various types of substrates with thin film transistors and electrodes formed thereon. In one exemplary embodiment the liquid crystal module employs a transparent glass substrate. The TFT substrate 111 according to the current exemplary embodiment includes a switching TFT for supplying an image data signal to a TFT for a driving circuit which controls the transmittance of the corresponding liquid crystal layer in the pixel. According to the current exemplary embodiment, the switching and driving TFTs include poly-silicon.

In an alternative exemplary embodiment the TFT substrate 111 may include a quartz glass-substrate.

If the exemplary embodiment of a liquid crystal module 110 according to the present invention is a reflective-type liquid crystal module, a single-crystalline substrate may be used instead of the TFT substrate 111. In such an exemplary embodiment the transistors formed on the single-crystal substrate may be used as a switching transistor of a pixel and a transistor of a driving circuit.

Exemplary embodiments of the present invention are not limited to the use of the opposite substrate 112, but can employ various types of substrates. In one exemplary embodiment of the present invention the opposite substrate 112 may be a transparent glass substrate. If the opposite substrate 112 is formed with a color filter (“CF”) formed thereon, an organic layer having pigment which transmits a specific color among red R, green G, and blue B may be arranged corresponding to each pixel electrode of the TFT substrate 111. In an alternative exemplary embodiment the CF may be formed on the TFT substrate 111.

In the exemplary embodiment wherein the liquid crystal display 100 is a transmissive-type liquid crystal display, the backlight unit 120 is installed on a rear side of the liquid crystal module 110, and the light generated from the backlight unit 120 is modulated by varying the transmittance of the liquid crystal module 110 so as to display the light from the backlight unit 120 as an image. In such an exemplary embodiment, both the TFT substrate 111 and the opposite substrate 112 are transparent substrates. In the exemplary embodiment wherein the liquid crystal module 110 is a reflective-type liquid module, a side light unit may be installed to provide light in addition to that being reflected from an outside.

The container 130 includes a bottom surface 131 and sidewalls 132 installed on lateral sides of the bottom surface 131 so as to receive the liquid crystal module 110 and the backlight unit 120 therein. In addition, the container 130 is coupled with the top chassis 140 so as to receive the liquid crystal module 110 to be fixed in the container 130. In addition to fixing the disposition of the liquid crystal molecule 110 in relation to the other components of the LCD 100, the container 130 may also prevent the breakage of the liquid crystal module 110 due to an external impact.

Figure 2:
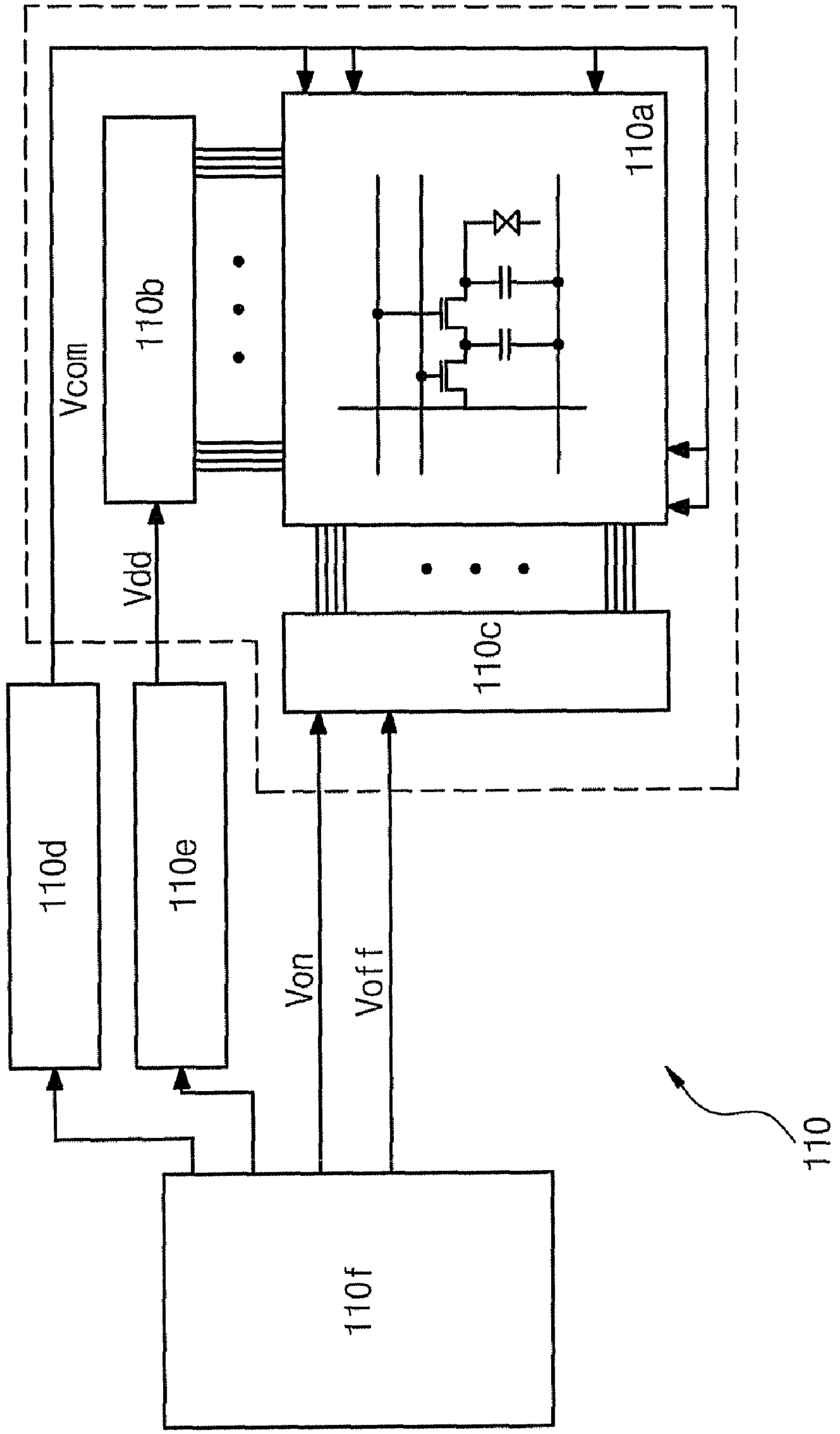
FIG. 2 is a block diagram showing an exemplary embodiment of a liquid crystal module of FIG. 1.

FIG. 2 is a block diagram showing an exemplary embodiment of the liquid crystal module 110 shown in FIG. 1 according to the present invention.

Referring to FIG. 2, the exemplary embodiment of a liquid crystal module 110 includes a pixel module 110*a* which has a plurality of pixels arranged in a substantially matrix shaped pattern, a data line driving circuit 110*b* which drives data lines (source lines) of the pixel module 110*a*, a gate line driving circuit 110*c* which drives gate lines of the pixel module 110*a*, a common voltage generator 110*d* (“Vcom generator”) which generates a common voltage, a gamma voltage generator 110*e* (“γ generator”), and a DC/DC converter 110*f* which supplies DC power to the gate line driving circuit 110*c*, the Vcom generator 110*d*, and the γ generator 110*e*.

In one exemplary embodiment the pixel module 110*a*, the data line driving circuit 110*b*, the gate line driving circuit 110*c*, the Vcom generator 110*d*, the γ generator 110*e*, and the DC/DC converter 110*f* can include TFTs. In another exemplary embodiment, the pixel module 110*a*, the data line driving circuit 110*b*, and the gate line driving circuit 110*c* can be constructed in the form of TFTs, and the Vcom generator 110*d*, the γ generator 110*e*, and the DC/DC converter 110*f* can be constructed in the form of integrated circuits on an IC chip.

Figure 3:
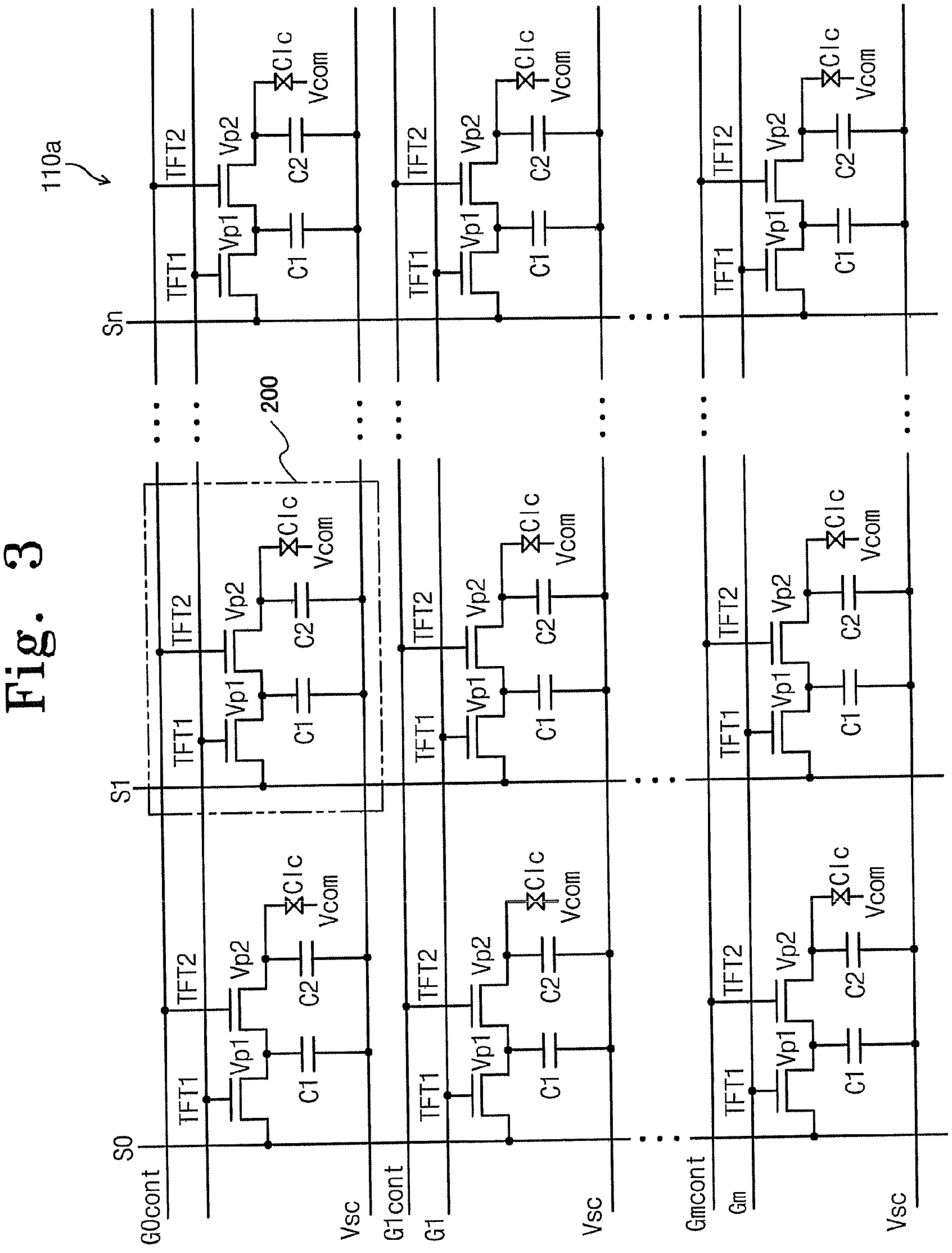
FIG. 3 is an equivalent circuit diagram showing an exemplary embodiment of the structure of a pixel module of FIG. 2.
Figure 4:
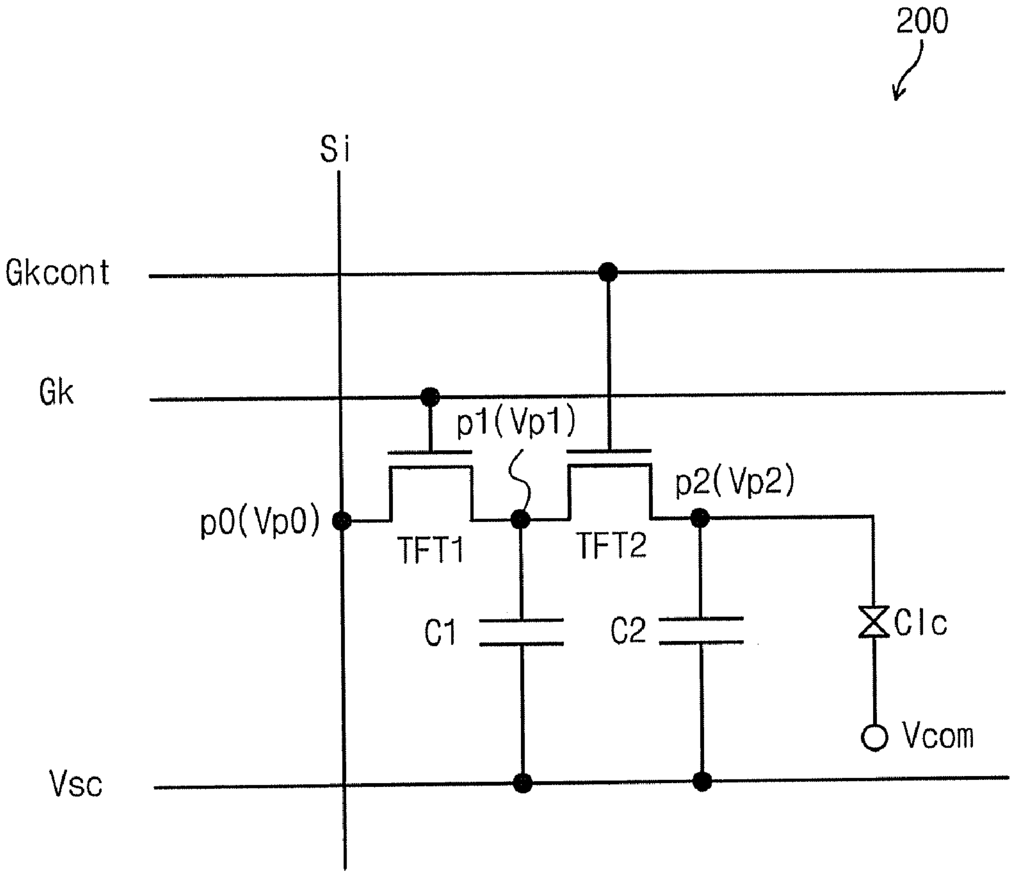
FIG. 4 is an equivalent circuit diagram showing an exemplary embodiment of one pixel of the exemplary embodiment of a pixel module of FIG. 3.

FIG. 3 is an equivalent circuit diagram showing an exemplary embodiment of the pixel module 110*a* shown in FIG. 2. FIG. 4 is an equivalent circuit diagram showing an exemplary embodiment of one pixel of the exemplary embodiment of a pixel module 110*a* shown in FIG. 3. An exemplary embodiment of a pixel in the $k^{th}$ row and the $i^{th}$ column of an exemplary embodiment of a pixel module 110*a* is shown in FIG. 4 and will be described below.

Referring to FIG. 3, the exemplary embodiment of a pixel module 110*a* of the exemplary embodiment of a liquid crystal module 110 has a plurality of pixels 200 arranged in a substantially matrix shaped pattern. The pixel module 110*a* has an m×n number pixels 200 arranged therein, wherein m and n represent natural numbers. In addition, a pixel positioned at a $k^{th}$ row and an $i^{th}$ column may represent a $(k, i)^{th}$ pixel. The $(k, i)^{th}$ pixel 200 is connected to a source line Si, a first gate line Gk, and a second gate line Gkcont.

As shown in FIG. 4, the pixel 200 has two thin film transistors TFT1 and TFT2. In the pixel 200, one of a source and a drain of the first thin film transistor TFT1 is connected to one of a source and a drain of the second thin film transistor TFT2. That is, the first thin film transistor TFT1 is serially connected to the second thin film transistor TFT2. Either the source or the drain terminal of the first thin film transistor TFT1 is connected to a source line Si. The terminal of the thin film transistor TFT1 connected to the source line Si is called p0, and the other terminal of the first thin film transistor TFT1, which is connected to a terminal of the second thin film transistor TFT2, is called p1. The terminal of the second thin film transistor TFT2 which is connected to the terminal p1 of the first transistor TFT1, is called p1 also, and the other terminal of the second thin film transistor TFT2 is called p2. In other words, the terminal p1 of the first thin film transistor TFT1 is connected to the terminal p1 of the second thin film transistor TFT2. The terminal p2 of the second thin film transistor TFT2 is connected to a pixel electrode (not shown).

A capacitor C1 is formed connected to a storage capacitor common line SC and the terminals p1 of the first thin film transistor TFT1 and the second thin film transistor TFT2. In addition, a capacitor C2 is formed connected to the storage capacitor common line SC and the terminal p2 of the second thin film transistor TFT2.

Further, a liquid crystal capacitor Clc is formed by the liquid crystal layer between the pixel electrode and the common electrode. Although according to the current exemplary embodiment the potential of the storage capacitor common line SC Vsc is equal to the potential Vcom of the common electrode the present invention is not limited thereto.

As shown in FIG. 4, the current exemplary embodiment of a pixel 200 has the two thin film transistors TFT1 and TFT2. The current exemplary embodiment of a liquid crystal module 110 controls signals applied to the gate lines Gk and Gkcont which are connected to the control terminals of the two thin film transistors TFT1 and TFT2, respectively, and the source line Si. The liquid crystal module 110 is thereby able to maintain the potential difference between the pixel electrode and the common electrode for substantially the entire duration of a frame.

Figure 5:
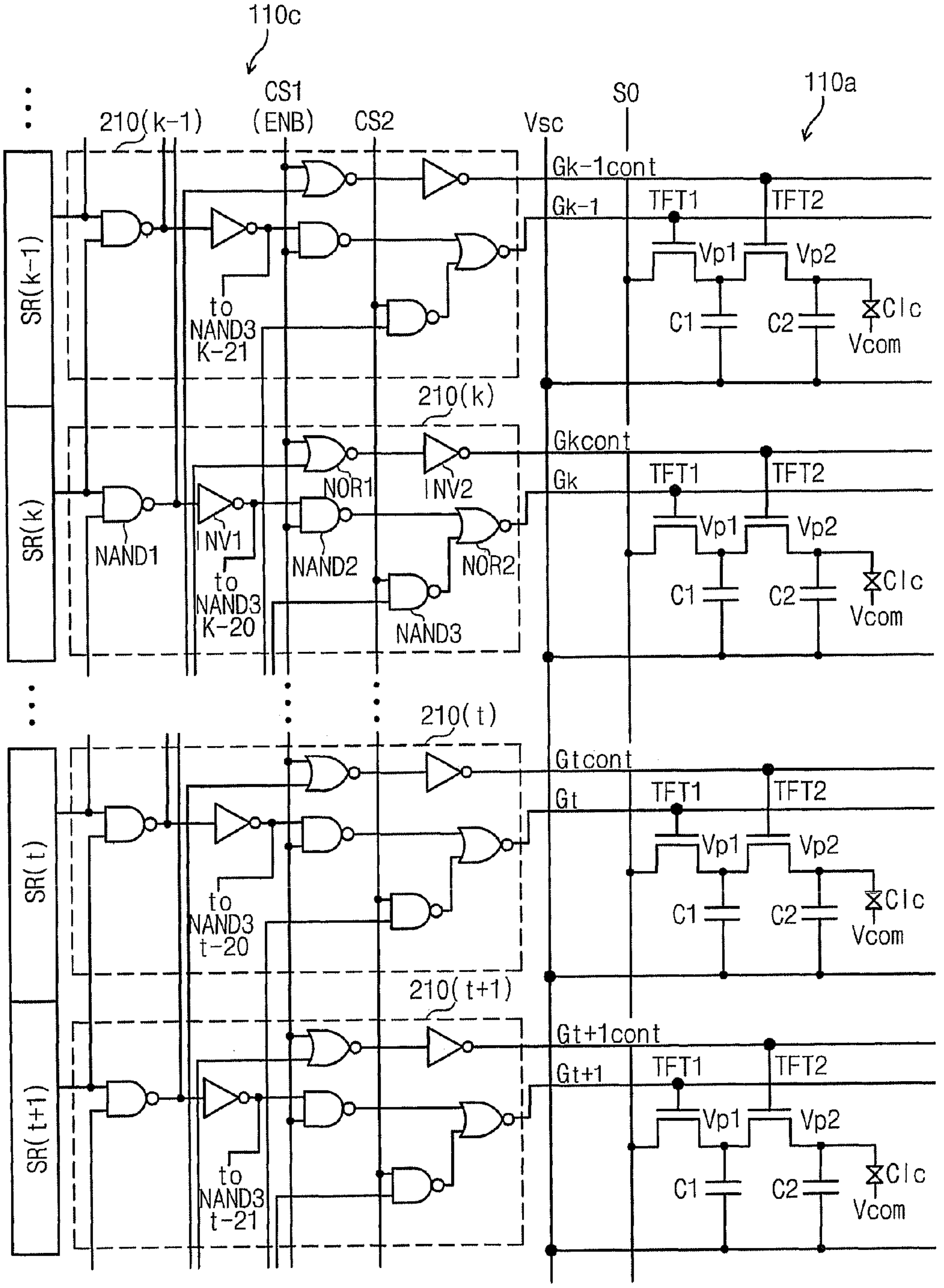
FIG. 5 is an equivalent circuit diagram schematically showing an exemplary embodiment of a gate line driving circuit of the exemplary embodiment of a liquid crystal module of FIG. 2.

FIG. 5 is an equivalent circuit diagram schematically showing an exemplary embodiment of the gate line driving circuit 110*c* of the exemplary embodiment of a liquid crystal module 110 according to the present invention. In detail, FIG. 5 shows a portion of the gate line driving circuit 110*c* connected to gate lines Gk−1 and Gk−1cont, Gk and Gkcont, Gt and Gtcont, and Gt+1 and Gt+1cont. The exemplary embodiment of a gate line driving circuit 110*c* having the circuit structure shown in FIG. 5 is only one exemplary embodiment adopted to realize the liquid crystal module according to the present invention, and may be suitably modified by those skilled in the art.

The gate line driving circuit 110*c* includes shift registers SR(0) to SR(n) and gate signal generating circuits 210(0) to 210(*n*) which receive timing signals from the shift registers SR(0) to SR(n) to generate timing signals which are then transmitted to the gate lines G1 to Gn and G1cont to Gncont. FIG. 5 shows gate signal generating circuits 210(*k*−1), 210(*k*), 210(*t*), and 210(*t*+1) connected to the gate lines Gk−1 and Gk−1cont, Gk and Gkcont, Gt and Gtcont, and Gt+1 and Gt+1cont, respectively.

According to the present exemplary embodiment, each of the gate signal generating circuits 210(0) to 210(*n*) have three NAND circuits NAND1, NAND2, and NAND3, two NOR circuits NOR1 and NOR2, and two inverter circuits INV1 and INV2. In addition, the exemplary embodiments of gate signal generating circuits 210(0) to 210(*n*) shown in FIG. 5 are only exemplary embodiments adopted to realize the liquid crystal module according to the present invention, and the present invention is not limited thereto.

The exemplary embodiment of the structure of the gate signal generating circuits 210(*k*−1), 210(*k*), 210(*t*), and 210(*t*+1) among the gate signal generating circuits 210(0) to 210(*n*) is shown in FIG. 5. As shown in FIG. 5, the gate signal generating circuits 210(0) to 210(*n*) have substantially the same circuit structure. Alternative exemplary embodiments include configurations wherein the circuit structure of the plurality of gate signal generating circuits varies.

The exemplary embodiment of a gate signal generating circuit 210(*k*) as shown in FIG. 5 will be described in more detail. The first NAND circuit NAND1 of the gate signal generating circuit 210(*k*) receives timing signals from the shift register circuit SR(k) and the shift register circuit SR(K+20) (not shown) which is shifted from the shift register circuit SR(k) by 20 stages. Although in current exemplary embodiment of a the first NAND circuit NAND 1 of the gate signal generating circuit 210(*k*) receives timing signals from the shift register circuit SR(k) and the shift register circuit SR(K+20) (not shown), this is but one exemplary embodiment and alternative exemplary embodiments of the type of the shift register circuit providing a timing signal to the first NAND circuit NAND1 may be suitably determined depending on an overdrive period Tover to apply an over drive voltage Vover, a display frequency, and a number of pixels, which will be described later.

The output of the first NAND circuit NAND1 is applied to the first inverter circuit INV1. The output of the first inverter circuit INV1 and a first common signal CS1 (an enable signal ENB) are input to the second NAND circuit NAND2. The output of the first NAND circuit NAND 1 (not shown) of the gate signal generating circuit 210(*k*+20) (not shown), which is shifted from the gate signal generating circuit 210(*k*) by 20 stages, and the first common signal CS1 are input to the first NOR circuit NOR1, the output of the first NOR circuit NOR1 is input to the second inverter circuit INV2, and the output of the second inverter circuit INV2 is applied to the second gate signal line Gkcont. In addition, although in the current exemplary embodiment the output of the NAND circuit NAND1 (not shown) of the gate signal generating circuit 210(*k*+20) (not shown), which is shifted from the gate signal generating circuit 210(*k*) by 20 stages, is applied to the first NOR circuit NOR1 of the gate signal generating circuit 210(*k*), alternative exemplary embodiments include configurations wherein a gate signal generating circuit including the first NAND circuit NAND1 generating an output signal applied to the first NOR circuit NOR1 of the gate signal generating circuit 210(*k*) is determined depending on the overdrive period Tover to apply the overdrive voltage Vover, the display frequency, and the number of pixels, which will be described later.

The output of the first inverter circuit INV 1 of the gate signal generating circuit 210(*k*+20), which is shifted from the gate signal generating circuit 210(*k*) by 20 stages, and the second common signal CS2 are input to the third NAND circuit NAND3. In addition, although in the current exemplary embodiment the output of the first inverter circuit INV1 of the gate signal generating circuit 210(*k*+20), and the second common signal are applied to the third NAND circuit NAND3, alternative exemplary embodiments include configurations wherein a gate signal generating circuit including the third NAND circuit NAND3 generating an output signal applied to the first NOR circuit NOR1 of the gate signal generating circuit 210(*k*) can be suitably determined depending on the overdrive period Tover to apply the overdrive voltage Vover, the display frequency, and the number of pixels, which will be described later.

The output of the second NAND circuit NAND2 and the output of the third NAND circuit NAND3 are applied to the second NOR circuit NOR2, and the output of the second NOR circuit NOR2 is applied to the first gate line Gk.

Hereinafter, the operation of the exemplary embodiment of a liquid crystal module 110 will be described with reference to FIGS. 4, 6 and 7.

Figure 6:
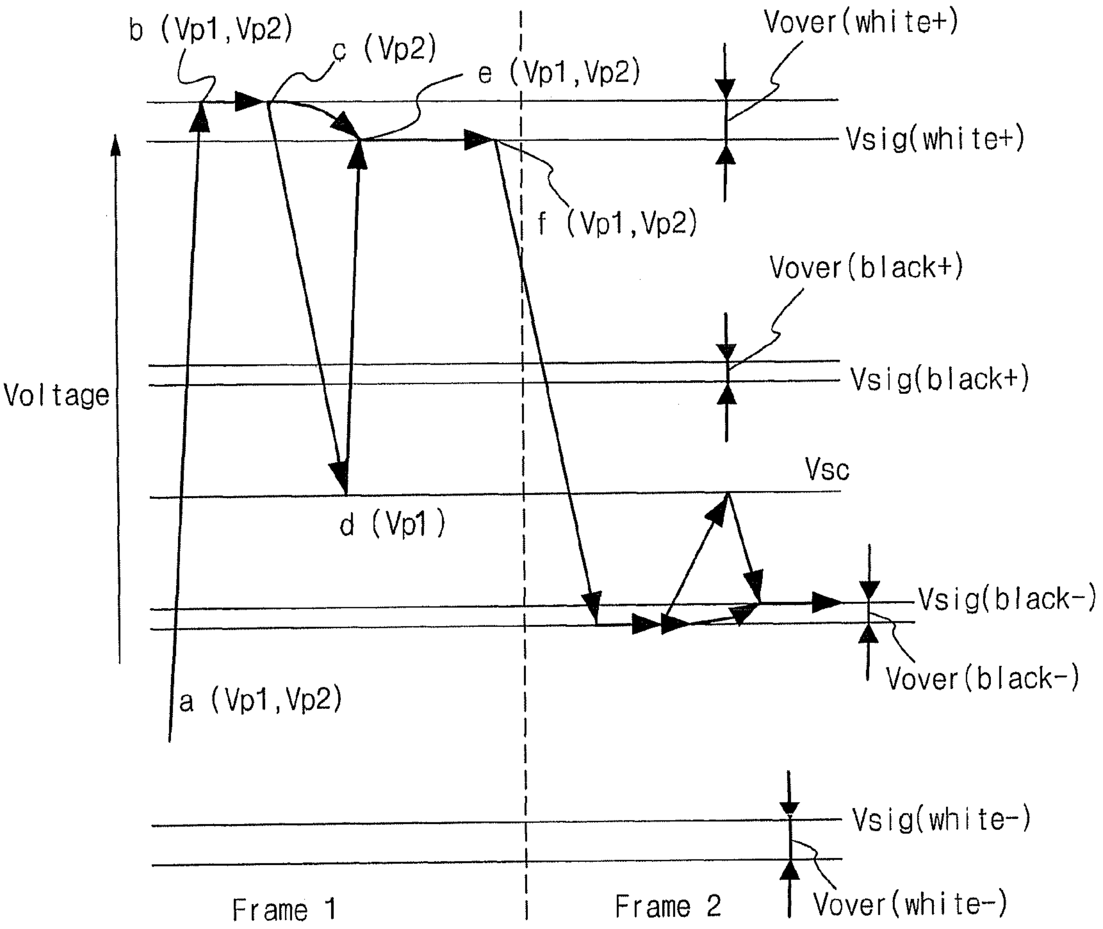
FIG. 6 is a diagram showing a potential transition of a pixel of an exemplary embodiment of a pixel module in the exemplary embodiment of a liquid crystal module of FIG. 2.

FIG. 6 is a diagram showing the potential transition of a pixel 200 of the exemplary embodiment of a pixel module 110*a* in the exemplary embodiment of a liquid crystal module 110 according to the present invention. The left side of FIG. 6 illustrates the potential voltage measured at terminals p1 and p2 in an exemplary embodiment of a pixel 200 during a first frame and the right side of FIG. 6 illustrates the potential voltage of those two terminals measured during a second frame. The exemplary embodiment of a pixel module 110*a* of the present invention shown in FIG. 6 utilizes inverse polarization of the data voltages from frame to frame. In the frame on the left hand side of FIG. 6 the data voltage has a positive voltage with respect to the common voltage Vcom. In the right hand side of FIG. 6 the data voltage has a negative voltage with respect to the common voltage Vcom. The polarity of the data voltage is indicated in FIG. 6 by placing a "+" or a "−" symbol behind the voltage level. In addition, FIG. 6 illustrates two different voltage intensities associated with the data voltage. The first frame shows a data voltage having an intensity corresponding to a white display (wherein the liquid crystal layer allows substantially all of the light to pass therethrough) and the second frame shows a data voltage having an intensity corresponding to a black display (wherein the liquid crystal layer allows only a small portion of the light to pass therethrough).

Figure 7:
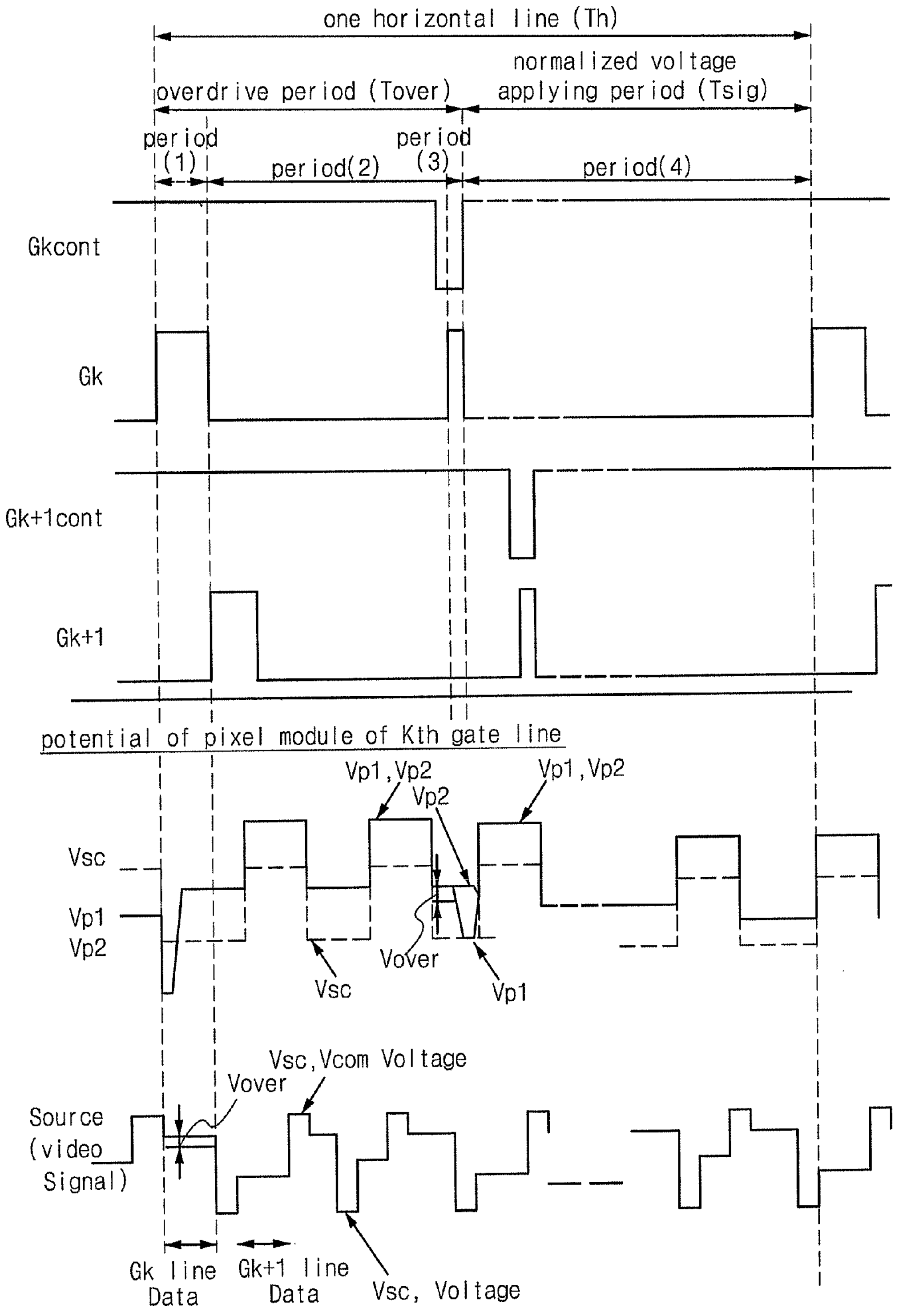
FIG. 7 is a timing chart showing an exemplary embodiment of the operation of and the potential transition of the pixel 200 of the exemplary embodiment of a liquid crystal module of FIG. 2.

In addition, FIG. 7 is a timing chart showing an exemplary embodiment of the operation of and the potential transition of the pixel 200 of the exemplary embodiment of a liquid crystal module 110 according to the present invention.

Here, a pixel (k, i) and a pixel (k+1, i) adjacent to the pixel (k, i) shown in FIG. 4 will be described. The potential transitions of other pixels are similar to those of the pixel (k, i) and the pixel (k+1, i).

Period (1): At the beginning of period (1) the voltage of terminals p1 and p2 are in a relatively low state (see state "a" in FIG. 6). a high signal is applied to the gate line Gkcont from the gate line driving circuit 110*c* so that the second thin film transistor TFT2 is turned on. Then, a high timing signal is transmitted to the gate line Gk so that the first transistor TFT 1 is turned on. At this time, a display signal Vsig+Vover is applied to the source line Si. According to the current exemplary embodiment, the display signal Vsig+Vover is obtained by adding an overdrive voltage Vover to an original display signal Vsig.

The first and second thin film transistors TFT1 and TFT2 are turned on, so that the display signal Vsig+Vover applied to the source line Si is charged into the terminal p1 of the first thin film transistor TFT1 and the terminal p2 of the second thin film transistor TFT2. When the terminal p1 of the first thin film transistor TFT1 has potential Vp1 and the terminal p2 of the second thin film transistor TFT2 has potential Vp2, since the first and second thin film transistors TFT1 and TFT2 are turned on, the potential Vp1 of the terminal p1 and the potential Vp2 of the terminal p2 are charged with the display signal Vsig+Vover (see state b of FIG. 6).

Period (2): The gate signal Gk becomes a low-level signal, and accordingly the first thin film transistor TFT1 is turned off, so that the potential Vp1 of the terminal p1 and the potential Vp2 of the terminal p2 are maintained in the display signal Vsig+Vover (see, state c of FIG. 6). In this case, a following equation 1 is obtained.

$$Vp1 = Vp2 = Vsig + Vover = Vsig + \frac{(C1 + C2 + Clc)Vover}{C1 + C2 + Clc} \quad \text{Equation 1}$$

Period (3): After several milliseconds have lapsed from period (1), a low signal is applied to the gate signal line Gkcont, thereby turning off the second thin film transistor TFT2, and a high signal is applied to the gate signal line Gk, thereby turning on the thin film transistor TFT1. At this time the source line Si has an inverse Vcom level, so when the first thin film transistor TFT1 is turned on the potential Vp1 of the terminal p1 is charged with a Vcom level (see state d of FIG. 6).

Period (4): A low signal is applied to the gate signal line Gk, thereby turning off the first thin film transistor TFT1, and a high signal is applied to the gate signal line Gkcont, thereby turning on the second thin film transistor TFT2. The voltage at terminals p1 and p2 are equalized by turning on the second thin film transistor TFT2. At this time, the potential Vp1 of the terminal p1 and the potential Vp2 of the terminal p2 satisfy a following equation 2 (see state e of FIG. 6).

$$Vp1 = Vp2 = Vsig + \frac{(C1 + C2 + Clc)V_{OVER} - C1 \cdot Vsig}{C1 + C2 + Clc} \quad \text{Equation 2}$$

In this case, the potential of the overdrive Vover is set such that the second term of the right side of equation 2 is equal to zero. Accordingly, Vp1=Vp2=Vsig is obtained. In other words, the overdrive Vover is set such that the equality of following equation (3) is achieved. Accordingly, Vp1=Vp2=Vsig is obtained.

$$V_{OVER} = \frac{C1}{C2 + Clc} \cdot Vsig \quad \text{Equation 3}$$

A desired display wherein Vsig is maintained at the pixel electrode for substantially the entire frame may be achieved through satisfying equation 3 to obtain the equation wherein Vp1=Vp2=Vsig (see state f of FIG. 6).

In addition, as shown in FIG. 6, the potential transition after the state f shows the variation of the driving voltage when a white color is changed into a black color during the next frame.

For example, in a normally black mode, on the assumption that C1=0.5, C2=1, and Clc=2, if the display signal Vsig for the white color represents 5V and the display signal Vsig for the black color represents 1.5V, the overdrive voltage Vover (white) given to the display signal for the white color is set as 0.8V, and the overdrive voltage Vover (black) given to the display signal for the black color is set as 0.25V.

In one exemplary embodiment, when an image is displayed with the frequency of 60 Hz, one horizontal interval corresponds to 16.7 msec. In such an exemplary embodiment the overdrive period Tover, which is equal to period (1)+period (2)+period (3), is about 50% or less of the total period (Tover+Tsig). In other words, the overdrive period Tover is about 8.87 msec or less when the image is displayed with the frequency of 60 Hz. In another exemplary embodiment the overdrive period Tover may be 5 msec or less, and the period (4) Tsig wherein a normalized image signal is applied may be 8 msec or more. In addition, the overdrive period Tover and the period (4) Tsig are not limited to the set time, but may be suitably set as predetermined.

Figure 8:
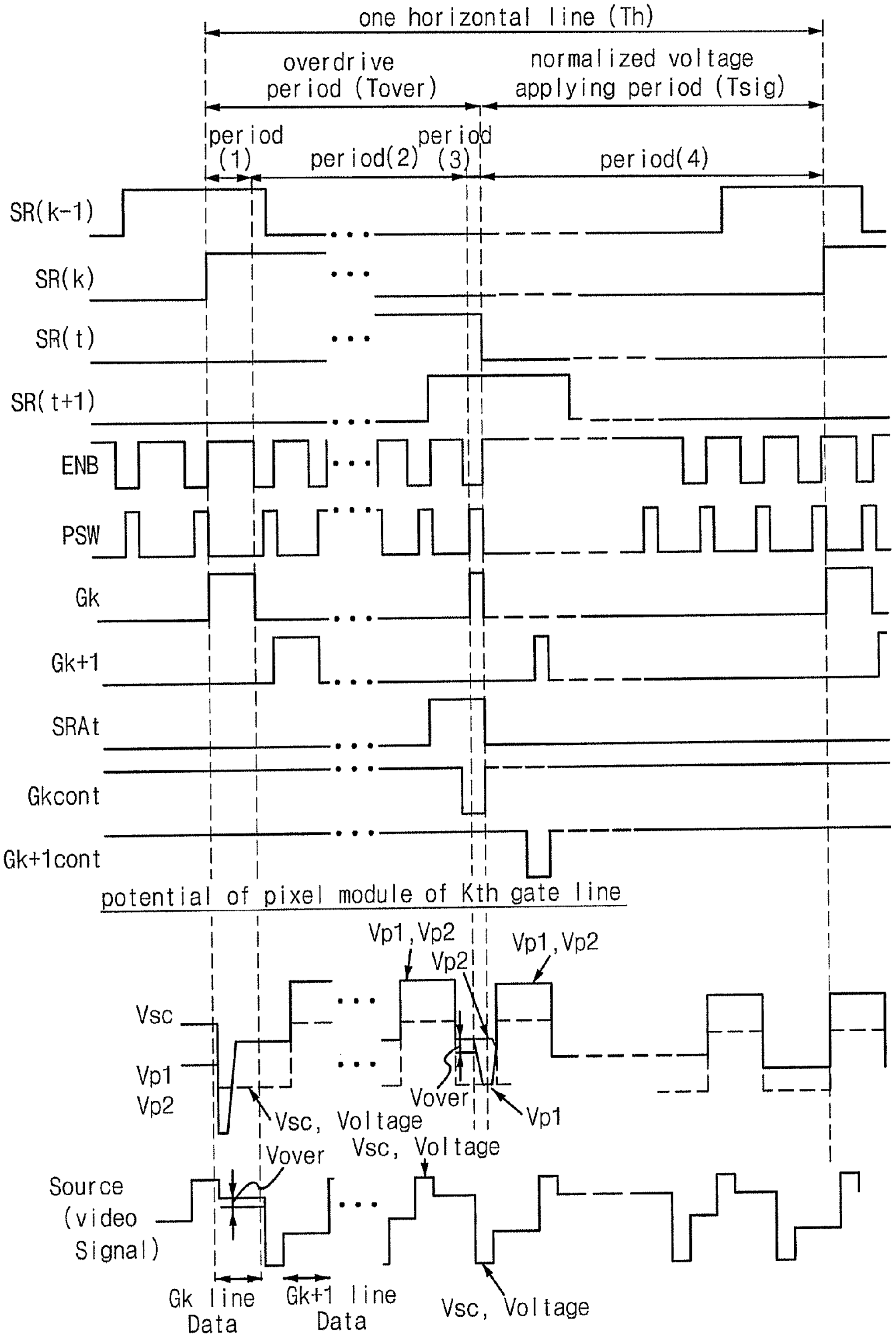
FIG. 8 is a timing chart showing exemplary embodiments of timing signals output from shift registers SR(k−1), SR(k), SR(t), and SR(t+1), an enable signal ENB, a PSW signal, gate signals of first gate lines Gk and Gk+1, gate signals of second gate lines Gkcont and Gk+1cont, latch signals SRAt, a potential Vp1 of a terminal p1, a potential Vp2 of a terminal p2, and a potential of a source line Si at a (k, i)$^{th}$ pixel.

FIG. 8 is a timing chart showing exemplary embodiments of timing signals output from the shift registers SR(k−1), SR(k), SR(t), and SR(t+1), the first common signal CS1 (enable signal ENB), a pulse swallow ("PSW") signal, gate signals of first gate lines Gk and Gk+1, gate signals of second gate lines Gkcont and Gk+1cont, and latch signals SRAt. In particular, FIG. 8 is a timing chart showing the potential Vp1 of the terminal p1, the potential Vp2 of the terminal p2, and the potential of a source line Si at the $(i, k)^{th}$ pixel.

According to the above-described exemplary embodiments of the liquid crystal module, the method of driving the same, and the liquid crystal display, the potential of the pixel electrode can be maintained during substantially an entire frame until the next frame, so that the image may be desirably displayed. Therefore, according to the above-described exemplary embodiments of the liquid crystal module, the method of driving the same, and the liquid crystal display, a response speed of the liquid crystal can be improved, so that a high-quality image can be provided.

Embodiment 2

Another exemplary embodiment employs a structure including a storage capacitor common line SC shared between neighboring pixels in the liquid crystal module 110.

Figure 9:
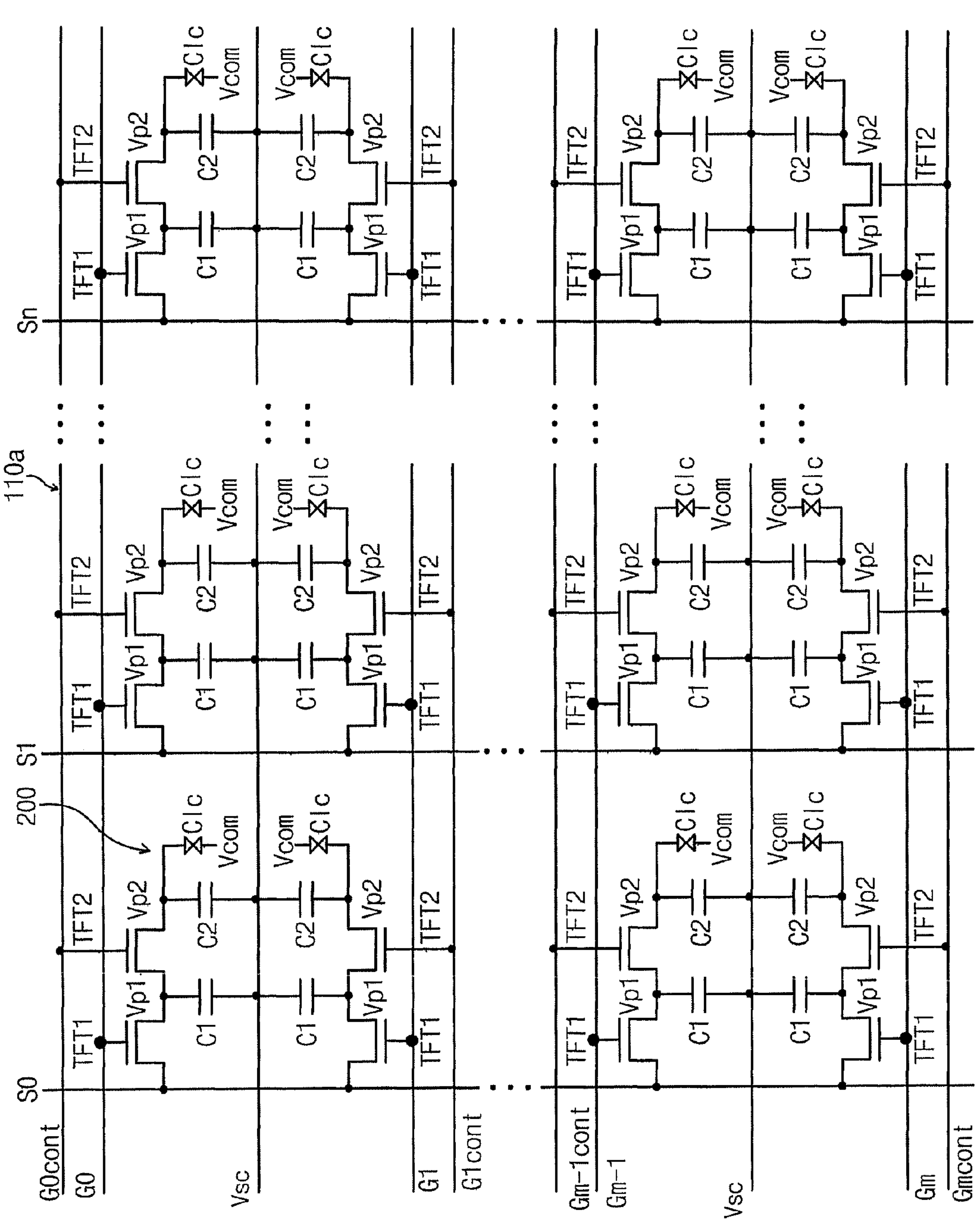
FIG. 9 is an equivalent circuit diagram showing another exemplary embodiment of a pixel module according to the present invention.

FIG. 9 is an equivalent circuit diagram showing another exemplary embodiment of a pixel module 110*a* according to the present invention.

Referring to FIG. 9, the exemplary embodiment of a pixel module 110*a* of the liquid crystal module 110 according to the present invention has a plurality of pixels 200 arranged in a matrix pattern. According to the current exemplary embodiment, the pixel module 110*a* has m×n pixels 200 arranged therein, wherein m and n represent natural numbers. A $(k, i)^{th}$ pixel 200 is connected to a source line Si, a first gate line Gk, and a second gate line Gkcont. According to the current exemplary embodiment, a storage capacitor common line SC is shared between neighboring pixels. Thus, in addition to the benefits obtained by the first embodiment of the present invention, the number of storage capacitor common lines SC can be reduced, so that a parasitic capacitance between the storage capacitor common lines is reduced. Accordingly, because there is less parasitic capacitance between the storage capacitor common lines, a charging time for the source line can be reduced. Further, the waveform of the source line is less deformed by the parasitic capacitance, so that a crosstalk can be reduced.

Embodiment 3

According to another exemplary embodiment, a first thin film transistor TFT1 and a second thin film transistor TFT2 constituting a pixel module 110*a* of a liquid crystal module 110 according to the present invention include amorphous silicon thin film transistors.

A liquid crystal module 110 according to the current exemplary embodiment has the same functional block diagram as the liquid crystal module 110 shown in FIG. 2. According to the current exemplary embodiment, the first thin film transistor TFT1 and the second thin film transistor TFT2 in a pixel 200 of the pixel module 110*a* include amorphous silicon thin film transistors, and a data line driving circuit 110*b*, a gate line driving circuit 110*c*, a common voltage Vcom generator 110*d*, a gamma voltage generator 110*e*, and a DC/DC converter 110*f* are constructed using integrated circuits on IC chips.

Embodiment 4

According to another exemplary embodiment, the first thin film transistor TFT1 and the second thin film transistor TFT2 of a pixel 200 of a liquid crystal module 110 according to the present invention include bottom gate-type thin film transistors or top gate-type thin film transistors.

Embodiment 5

According to another exemplary embodiment, the liquid crystal display is the reflective-type liquid crystal display. In the liquid crystal display according to the current exemplary embodiment, a pixel electrode includes a reflective metal and reflects an external light. The current exemplary embodiment has a structure which is substantially similar to the other exemplary embodiments except for the structure of the pixel electrode.

Hereinafter, a liquid crystal module 310 of the reflective-type liquid crystal display will be described in detail with reference to FIG. 10.

Figure 10:
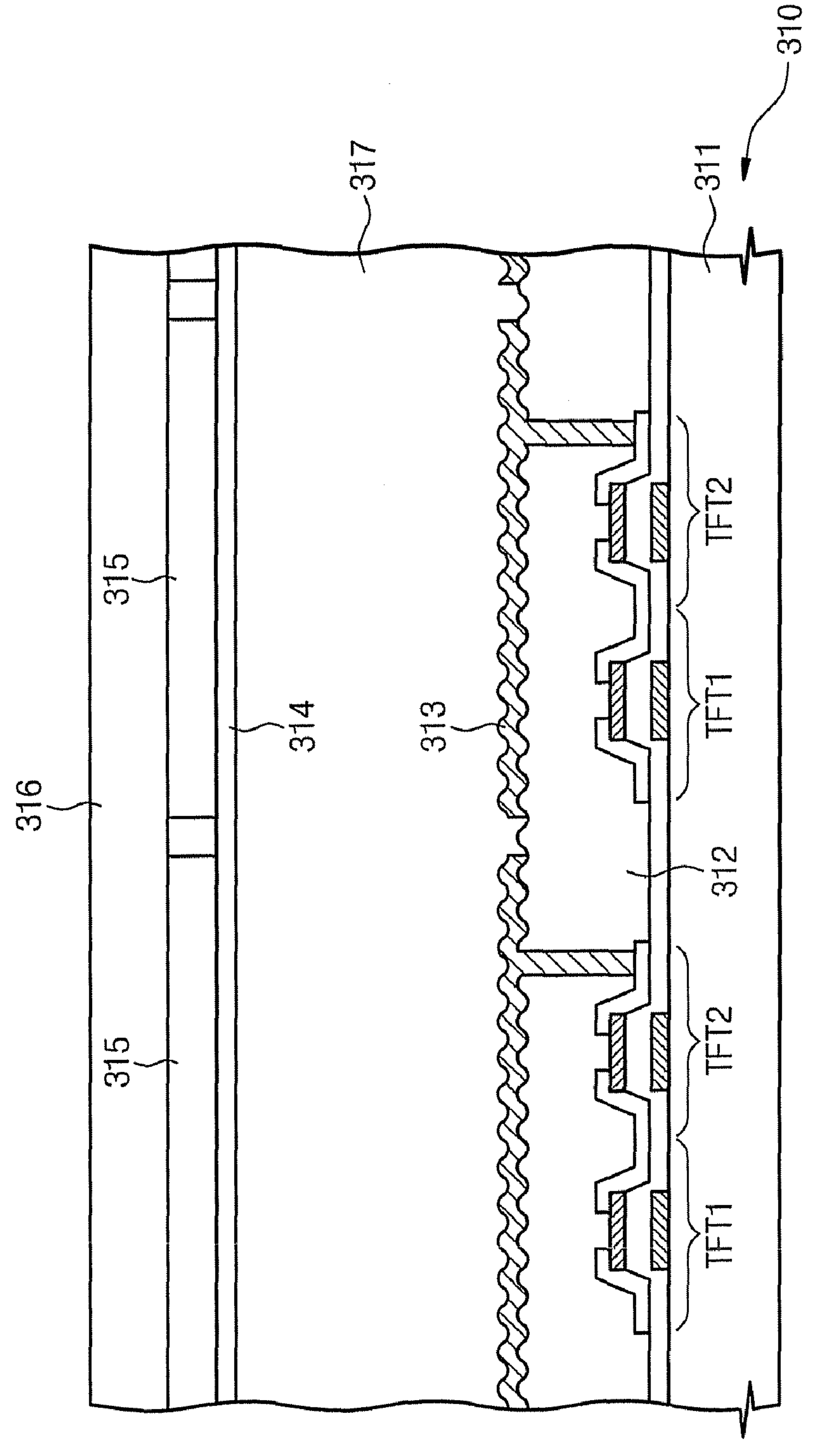
FIG. 10 is a cross-sectional view showing an exemplary embodiment of a liquid crystal module in a reflective-type liquid crystal display according to the present invention.

FIG. 10 is a cross-sectional view showing the structure of the pixel module of the liquid crystal module 310 according to the current exemplary embodiment of the present invention.

Referring to FIG. 10, the pixel module of the liquid crystal module 310 includes a substrate 311, an inter-layer dielectric layer 312, a pixel electrode 313, a common electrode 314, a color filter 315, an opposite substrate 316, and a liquid crystal layer 317. According to the current exemplary embodiment, the pixel module of the liquid crystal module 310 includes a reflective metal. External light incident on the liquid crystal module 310 is modulated by the liquid crystal layer 317, reflected by the pixel electrode 313, and then output to an exterior again. In another exemplary embodiment the reflective-type liquid crystal display may include a side light device (not shown) to supply a side light in the side surface of the liquid crystal module 310.

In another exemplary embodiment a color filter may be formed on the upper part of the pixel electrode 313 of the substrate 311.

As described above, according to the exemplary embodiments of the present invention, the first and second thin film transistors TFT1 and TFT2 constituting the pixel module of a liquid crystal module may include the bottom gate-type thin film transistors, or the top gate-type thin film transistors.

The above-described exemplary embodiments of liquid crystal modules, methods of driving the same and liquid crystal displays according to the present invention may be employed in various kinds of fields including monitor devices of portable telephones, monitor devices of personal computers, and displays of TVs.

Although the exemplary embodiments of the present invention have been described, it is understood that the present invention should not be limited to the above-described exemplary embodiments of liquid crystal modules, methods of driving the same, and liquid crystal displays according to the present invention but various changes and modifications can be made by one ordinary skilled in the art within the spirit and scope of the present invention as hereinafter claimed.

What is claimed is:

1. A liquid crystal display device comprising:

a plurality of pixels arranged substantially in a matrix pattern;

wherein each of the plurality of pixel comprises:

a first thin film transistor including a source, a drain, and a gate, in which one of the source and the drain is connected to a source line, and the gate is connected to a first gate signal line, a second thin film transistor including a source, a drain, and a gate, in which one of the source and the drain of the second thin film transistor is connected to a pixel electrode, the other one of the source and the drain of the second thin film transistor is connected to one of the source and the drain of the first thin film transistor, and the gate of the second thin film transistor is connected to a second gate signal line;

a storage capacitor line;

a first capacitor connected between the first thin film transistor and the second thin film transistor and connected to the storage capacitor line;

a second capacitor connected between one of the source and the drain of the second thin film transistor and the pixel electrode and connected to the storage capacitor line; and a third capacitor including the pixel electrode, a common electrode, and a liquid crystal layer disposed between the pixel electrode and the common electrode, wherein an overdrive voltage satisfying an equation $$Vover = \frac{C1}{C2 + Clc} \cdot Vsig$$

is added to a display signal voltage and a resultant voltage is applied to the source line, and wherein C1, C2, Clc, Vover and Vsig represent the first capacitor, the second capacitor, the third capacitor, the overdrive voltage, and the display signal voltage, respectively.

2. The liquid crystal display device of claim 1, wherein the first thin film transistor and the second thin film transistor include poly-silicon.

3. The liquid crystal display device of claim 1, wherein the first thin film transistor and the second thin film transistor include amorphous silicon.

4. The liquid crystal display device of claim 1, wherein the storage capacitor line is shared with a plurality of pixels in an adjacent row.

5. The liquid crystal display device of claim 1, wherein the pixel electrode further comprises a reflective metal.

6. The liquid crystal display device of claim 1, further comprising:

a backlight unit.

7. The liquid crystal display device of claim 5, further comprising:

a side light unit.

8. A method of driving a liquid crystal display device including a plurality of pixels arranged substantially in a matrix pattern, wherein each pixel includes a first thin film transistor including a source, a drain, and a gate, in which one of the source and the drain is connected to a source line, and the gate is connected to a first gate signal line, a second thin film transistor including a source, a drain, and a gate, wherein one of the source and the drain of the second thin film transistor is connected to a pixel electrode, the other one of the source and the drain of the second thin film transistor is connected to the source or the drain of the first thin film transistor, and the gate of the second thin film transistor is connected to the second gate signal line, a storage capacitor line, a first capacitor including a junction part between the first thin film transistor and the second thin film transistor, the storage capacitor line, and a first insulator between the junction part and the storage capacitor line, a second capacitor including the source or the drain of the second thin film transistor connected to the pixel electrode, the storage capacitor line, and a second insulator between source or the drain of the second thin film transistor and the storage capacitor line, and a third capacitor including the pixel electrode, a common electrode, and a liquid crystal layer disposed between the pixel electrode and the common electrode, the method comprising:

adding an overdrive voltage satisfying an equation $$Vover = \frac{C1}{C2 + Clc} \cdot Vsig$$

to a display signal voltage; and applying a resultant voltage to the source line, wherein C1, C2, Clc, Vover and Vsig represent the first capacitor, the second capacitor, the third capacitor, the overdrive voltage and the display signal voltage, respectively.

9. The method of claim 8, further comprising:

inputting a high signal to the second gate signal line;

inputting a high signal to the first gate signal line;

applying a value of (Vsig+Vover) to the source line;

inputting a low signal to the first gate signal line;

inputting a low signal to the second gate signal line;

inputting a high signal to the first gate signal line; and inputting a low signal to the first gate signal line for one pixel, wherein each step is performed in sequence.

10. The method of claim 8, further comprising:

turning on the second thin film transistor;

turning on the first thin film transistor;

applying a value of (Vsig+Vover) to the source line;

turning off the first thin film transistor;

turning off the second thin film transistor;

turning on the first thin film transistor; and turning off the first thin film transistor for one pixel, wherein each step is performed in sequence.

11. A method of manufacturing a display device, the method comprising:

disposing a plurality of pixels in a substantially matrix shaped pattern;

forming each of the plurality of pixels to include a first thin film transistor and a second thin film transistor, each of the thin film transistors including a source, a drain and a gate;

connecting one of the source and the drain of the first thin film transistor to a source line;

connecting the gate line of the first transistor to a first gate signal line;

connecting one of the source and the drain of the second thin film transistor to a pixel electrode;

connecting the other one of the source and the drain of the second thin film transistor to one of the source and the drain of the first thin film transistor;

connecting the gate of the second thin film transistor to a second gate signal line;

forming a storage capacitor line;

connecting a first capacitor to a region between the first thin film transistor and the second thin film transistor and the storage capacitor line;

connecting a second capacitor to a region between one of the source and the drain of the second thin film transistor and the pixel electrode and the storage capacitor line; and forming a third capacitor including the pixel electrode, a common electrode, and a liquid crystal layer disposed between the pixel electrode and the common electrode, wherein an overdrive voltage Vover satisfying an equation Vover=C1/C2+Clc•Vsig is added to a display signal voltage Vsig and a resultant voltage thereof is applied to the source line, and wherein C1, C2, and Clc, Vover and Vsig represent the first capacitor, the second capacitor, and the third capacitor, the overdrive voltage, and the display signal voltage, respectively.

* * * * *